United States Patent
Cometto et al.

(10) Patent No.: US 8,203,950 B2
(45) Date of Patent: Jun. 19, 2012

(54) QUALITY OF SERVICE IN A STORAGE AREA NETWORK

(75) Inventors: Maurilio Cometto, Fremont, CA (US); Jeevan Kamisetty, San Jose, CA (US); Arindam Paul, Sunnyvale, CA (US); Varagur V. Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 397 days.

(21) Appl. No.: 11/625,678

(22) Filed: Jan. 22, 2007

(65) Prior Publication Data

US 2008/0175160 A1    Jul. 24, 2008

(51) Int. Cl.
*G01R 31/08*    (2006.01)
(52) U.S. Cl. .................. 370/230.1; 370/235; 370/395.21
(58) Field of Classification Search .................. 370/230, 370/230.1, 231, 235, 395.2, 395.21, 412
See application file for complete search history.

(56) References Cited

U.S. PATENT DOCUMENTS

| | | | | |
|---|---|---|---|---|
| 6,621,824 | B1 * | 9/2003 | Lauffenburger et al. | 370/412 |
| 2002/0110139 | A1 * | 8/2002 | Boura et al. | 370/432 |
| 2003/0079019 | A1 * | 4/2003 | Lolayekar et al. | 709/226 |
| 2006/0245356 | A1 * | 11/2006 | Porat et al. | 370/232 |
| 2006/0274654 | A1 * | 12/2006 | Shankara | 370/230 |

OTHER PUBLICATIONS

Walder, "Storage Area Network Overview," *Commsdesign*, http://www.commsdesign.com/showArticle.jhtml?articleID=192200416, Jun. 5, 2002.

* cited by examiner

*Primary Examiner* — Derrick Ferris
*Assistant Examiner* — Peter Cheng
(74) *Attorney, Agent, or Firm* — Weaver Austin Villenneuve & Sampson LLP (57) ABSTRACT

In one embodiment, a solution is provided wherein a minimum and/or maximum bandwidth may be guaranteed for specific flows. These guarantees can be associated to various levels of granularity, such as target (T), target-Logical Unit Number (LUN) coupling (TL), initiator-target-LUN coupling (ITL), and initiator-target coupling (IT). This may be accomplished by rate limiting frames in the storage area network based upon quality of service information provided by a user. As such, the traffic can be shaped in a way that guarantees requested levels of service without dropping frames.

16 Claims, 8 Drawing Sheets

QUALITY OF SERVICE IN A STORAGE AREA NETWORK

BACKGROUND OF THE INVENTION

1. Technical Field

The present disclosure relates to storage area networks.

2. Description of the Related Art

Storage Area Networks (SANs) are computer systems in which large mass storage devices such as Redundant Array of Independent Disks (RAID) devices are connected to a central processor or processors via high-speed network technology (as opposed to, for example, via a system bus). SANs are increasingly used to store vast amounts of information and their usage has grown exponentially with the rise of the Internet.

Figure 1:
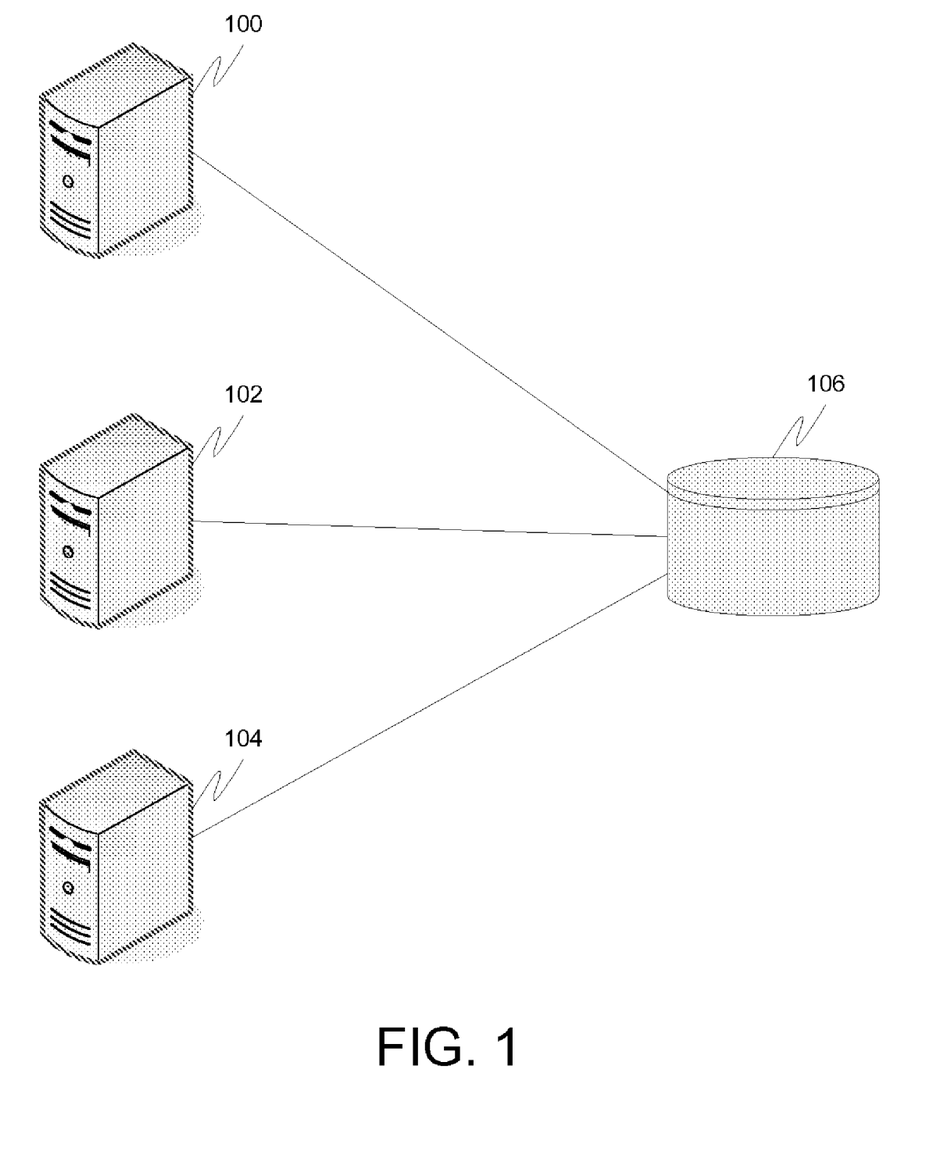
FIG. 1 illustrates a typical centralized SAN.

There are two general ways to implement SANs: centralized and decentralized. A centralized SAN ties multiple hosts into a single storage system with large amounts of cache and redundant power supplies. FIG. 1 illustrates a typical centralized SAN. Initiators, also known as hosts 100, 102, 104 communicate with a large mass storage device 106, also known as targets.

Figure 2:
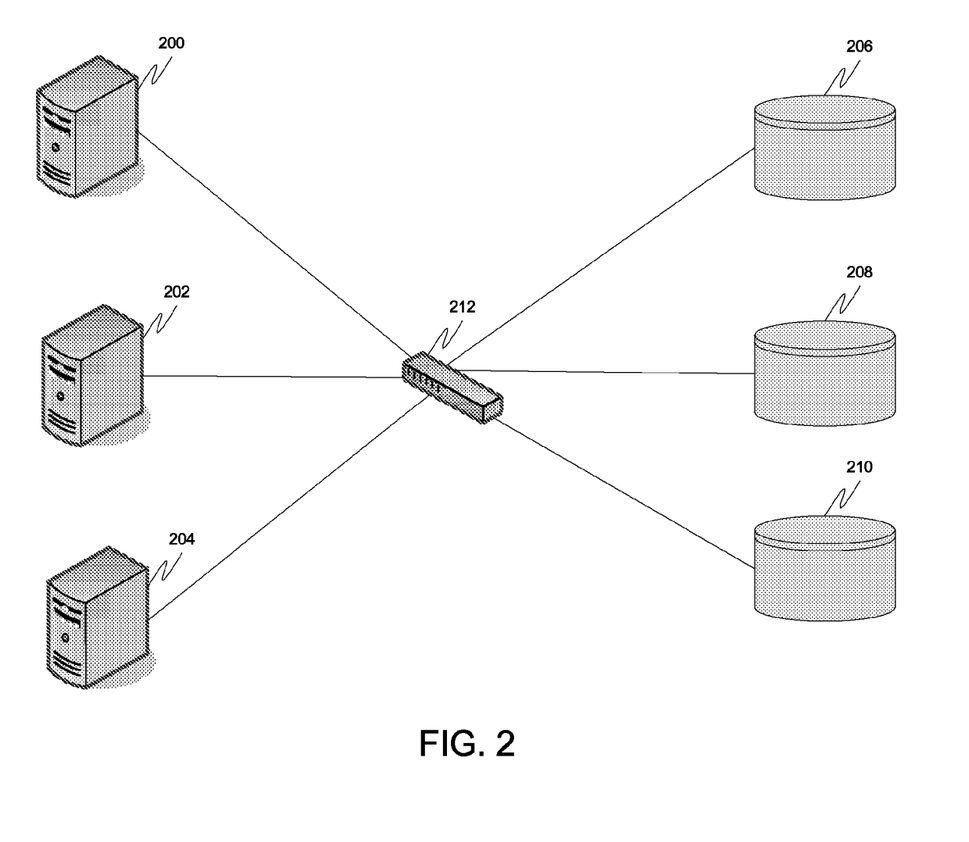
FIG. 2 illustrates a typical distributed SAN.

A decentralized SAN, on the other hand, connects multiple mass storage devices with a centralized controller, such as a switch, that coordinates storage between the hosts and the multiple mass storage devices. FIG. 2 illustrates a typical distributed SAN. Here, initiators 200, 202, 204 communicate with a virtual SAN comprised of a number of large mass storage devices 206, 208, 210 via a switch 212.

There are a number of various applications that can be utilized within a SAN, for example, volume management applications, data replication applications, data migration applications, and data protection applications. These applications are operated at either the host side or the storage side.

In low-bandwidth environments, the available resources were simply assigned to hosts as needed or requested. A high-bandwidth storage area network environment, however, opens up the possibility of assigning available resources in a manner that might make more sense from either the business or technical standpoint.

BRIEF DESCRIPTION OF THE DRAWINGS

FIG. 3A illustrates an examples with.

DESCRIPTION OF EXAMPLE EMBODIMENTS

Overview

A solution is provided wherein a minimum and/or maximum bandwidth may be guaranteed for specific flows. These guarantees can be associated to various levels of granularity, such as target (T), target-Logical Unit Number (LUN) coupling (TL), initiator-target-LUN coupling (ITL), and initiator-target coupling (IT). This may be accomplished by rate limiting frames in the storage area network based upon quality of service information provided by a user. As such, the traffic can be shaped in a way that guarantees requested levels of service without dropping frames.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

A solution is provided wherein a minimum and/or maximum bandwidth may be guaranteed for specific flows. These guarantees can be associated to various levels of granularity, such as target (T), target-Logical Unit Number (LUN) coupling (TL), initiator-target-LUN coupling (ITL), and initiator-target coupling (IT).

For example, a user or administrator may choose to configure a certain value of minimum bandwidth to be always available to one particular target. Alternatively, a certain bandwidth may be guaranteed to IOs from a certain host to a certain VLUN of a certain target. Furthermore, as will be described in more detail below, hosts, LUNs, and targets may be represented by virtual objects using virtualization techniques.

Figure 3:
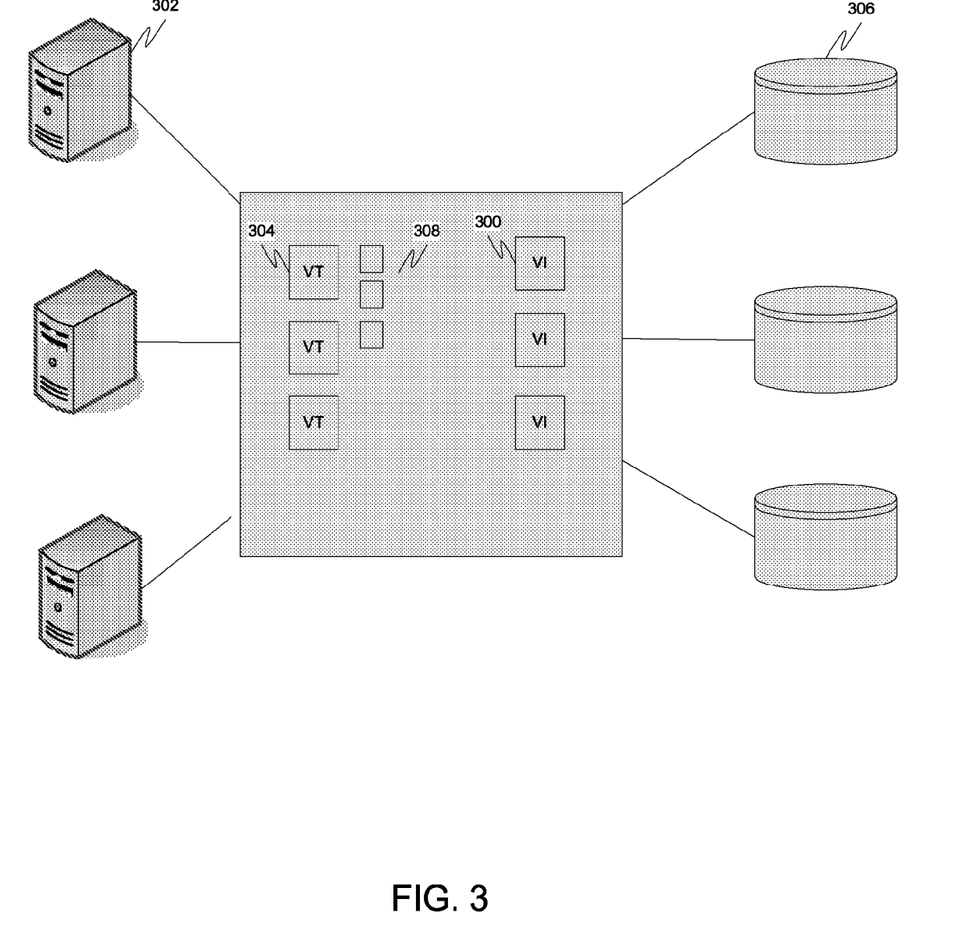
FIG. 3 illustrates an example platform implementing intelligent applications.

In an embodiment of the present invention, the switch may maintain various objects to represent the mappings between hosts and targets. FIG. 3 illustrates an example platform implementing intelligent applications. Virtual initiators 300, initiators 302, virtual targets 304 and mass storage devices 306 may correspond to each other in an any-to-any mapping. LUNs 308 may be assigned to individual devices within a mass storage device 306, making it possible to apply the QoS not just to generalized large array of storage devices 306 but also to individual devices. Furthermore, virtual LUNs may be substituted for LUNs and each may correspond to one or more actual LUNs.

Figure 3A:
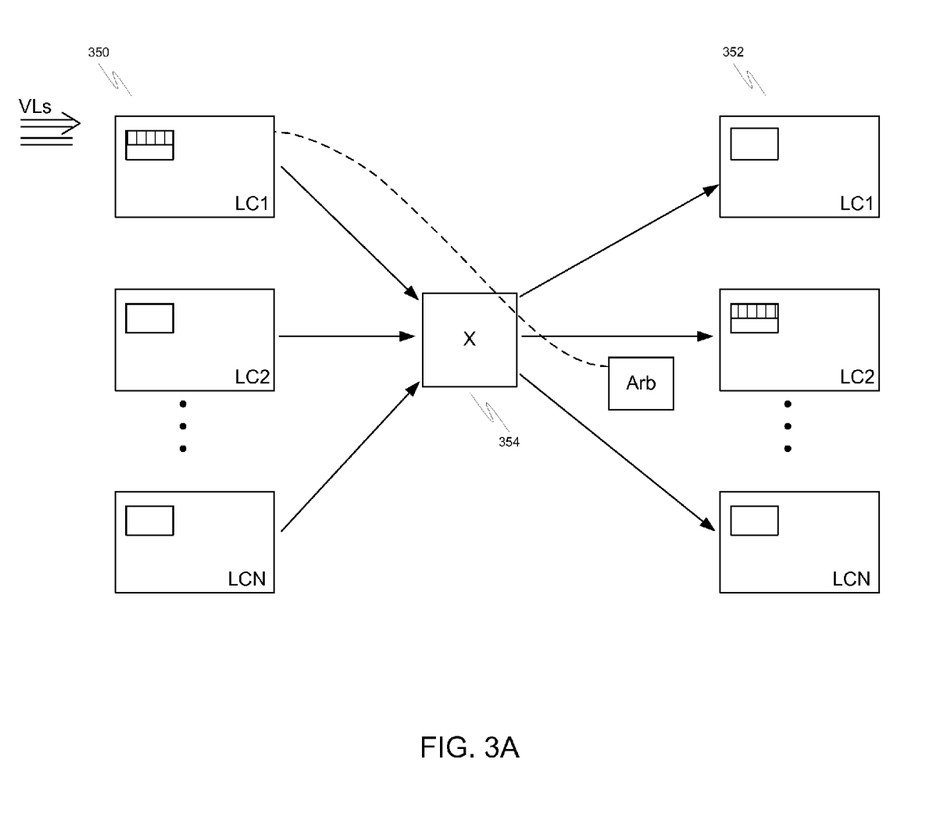

FIG. 3A illustrates an example switch. The methods and components of the present invention may be implemented in one or more line cards 350, 352 within the switch. These line cards may be connected via a switching fabric 354.

Figure 4:
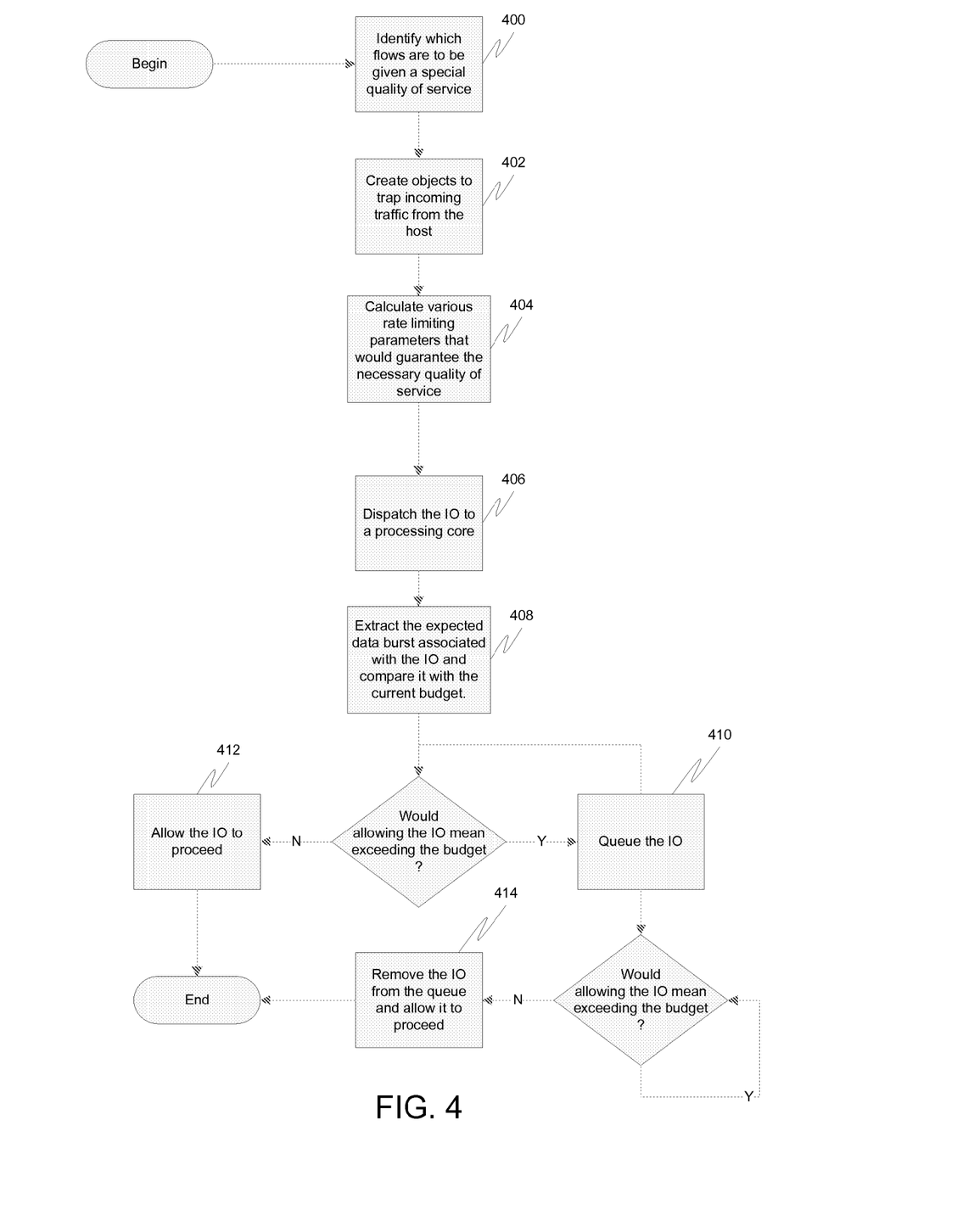
FIG. 4 illustrates an example method for configuring quality of service in a storage area network.

FIG. 4 illustrates an example method for configuring quality of service in a storage area network. At 400, a user may identify which flows are to be given a special quality of service. At 402, objects may be created to trap incoming traffic from the host. In an embodiment of the present invention, these objects may be Ternary Content Addressable Memory (TCAM) entries. In another embodiment of the present invention, software lookup tables may be utilized. At 404, various rate limiting parameters that would guarantee the necessary quality of service may be calculated. This may include, for example, a budget for each flow. This calculation may be performed even for traffic that is not configured for any favored quality of service. By doing so, it helps guarantee the levels of quality of service requested for other flows. As such, traffic can belong to either a user-configured flow or an unclassified flow. Any bandwidth left over after accounting for all the user specified flows may be allocated to the unclassified flows.

At 406, the IO may be dispatched to a processing core. At 408, the processing core may extract the expected data burst associated with the IO and compare it with its current budget. If allowing the IO would mean exceeding the budget, then at 410 the IO may be queued and not allowed to proceed to further processing until the pipe is less clogged. Otherwise, at 412, the IO is allowed to proceed and the budget is adjusted accordingly. For queued IOs, once the pipe is less clogged, at 414 the IO may be removed from the queue and allowed to proceed. Periodically, assuming the IOs either finish or are aborted within a defined upper bound, the budget may be adjusted to make room for additional IOs after taking into consideration the rate associated with the "bucket."

In an embodiment of the present invention, rate limiting on the back-end (i.e., on the mass storage devices) may be accomplished via rate limiting on the front-end. This is because a host IO queued at the front end does not generate the IO at the back end.

In an embodiment of the present invention, the data structures/objects related to the rate limiting functionality, e.g., variables, token buckets, etc. are kept in a shared memory location and accessed mutually exclusively by the various processing cores, assuming there are multiple processing cores. In another embodiment of the present invention, a single processor environment is utilized and thus shared memory locations are unnecessary.

Figure 5:
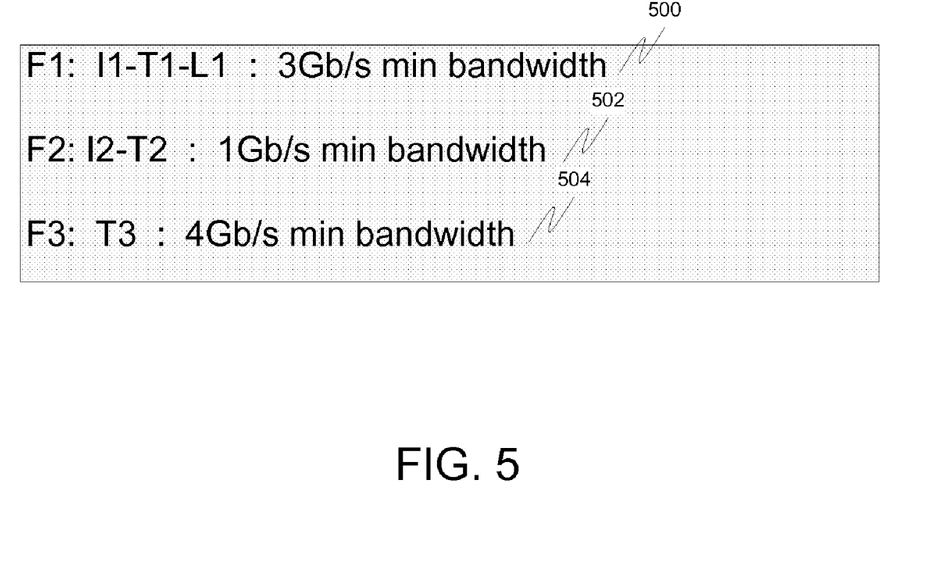
FIG. 5 illustrates an example of user-configured quality of service in a storage area network.

FIG. 5 illustrates an example of user-configured quality of service in a storage area network. Here, three flows are represented by F1, F2, and F3. The user has configured a 3 Gb/s minimum bandwidth for F1 based on initiator-target-LUN (represented by reference numeral 500). The user has configured a 1 Gb/s minimum bandwidth for F2 based on initiator and target (represented by reference numeral 502). The user has then configured a 4 Gb/s minimum bandwidth for F3 based on target (represented by reference numeral 504). Therefore, assuming a 10 Gb/s total bandwidth, that leaves 2 G/s available for other, unclassified flows. Therefore, every IO issued by, for example, I1 to T2 would be part of an unclassified flow. Thus, every such IO would be queued if at any point in time the total utilized unclassified flow bandwidth exceeds 2 Gb/s. Likewise, every IO in a classified flow may be queued if the total bandwidth for that particular flow exceeds the bandwidth parameter. Notably, IOs are not "dropped". Instead, the flow is shaped by various techniques (deferring, delaying, sending busy signals, etc.). Additionally, if there is significant available bandwidth in the system as a whole, it may be desirable to simply allow the IO to proceed without delay.

In an embodiment of the present invention, bandwidth guarantees need to take into account the characteristics of the back-end targets. For example, with WRITE commands, there is greater control on meeting bandwidth guarantees since the data size in the IO is known. For READ commands, however, the size of the data depends on what is sent back by the back-end targets. Therefore, the user may, for each level of granularity (i.e., ITL, TL, etc.), set different guaranteed bandwidth for WRITE and READ IOs.

If bandwidth guarantees are not calculated properly, flows from multiple nodes fanning into a single target may cause resource contention at the target leading to violation of each others' quality of service guarantees. For example, consider two flows F1 and F2 being rate limited at node N1 and N2 and a target T at which the flows terminate. Even if F1 and F2 are guaranteed a certain bandwidth, e.g., Q(F1) and Q(F2), if Q(F1)+Q(F2)+ the sum of all other non-guaranteed flows to T is greater than the maximum supported bandwidth for T, then it is likely that the guarantee for F1 and F2 will be affected. In a distributed network, a user may have to carefully identify flows on a per target basis and ensure that the flows do not overrun the bandwidth capacity of their target. Alternatively, this may be handled automatically.

In an embodiment of the present invention, another, more elegant solution is provided. In this embodiment, the customer may procure a virtualization license. In that case, each real target may be fronted by a virtual target and the quality of service may be enforced at the node where the virtual target is instantiated. By channeling all traffic destined to a particular target to flow through a particular node, and enforcing the quality of service on that node, the system is able to precisely control the target bandwidth allocated among the flows. This greatly simplifies the accounting and management for quality of service enabled flows.

Figure 6:
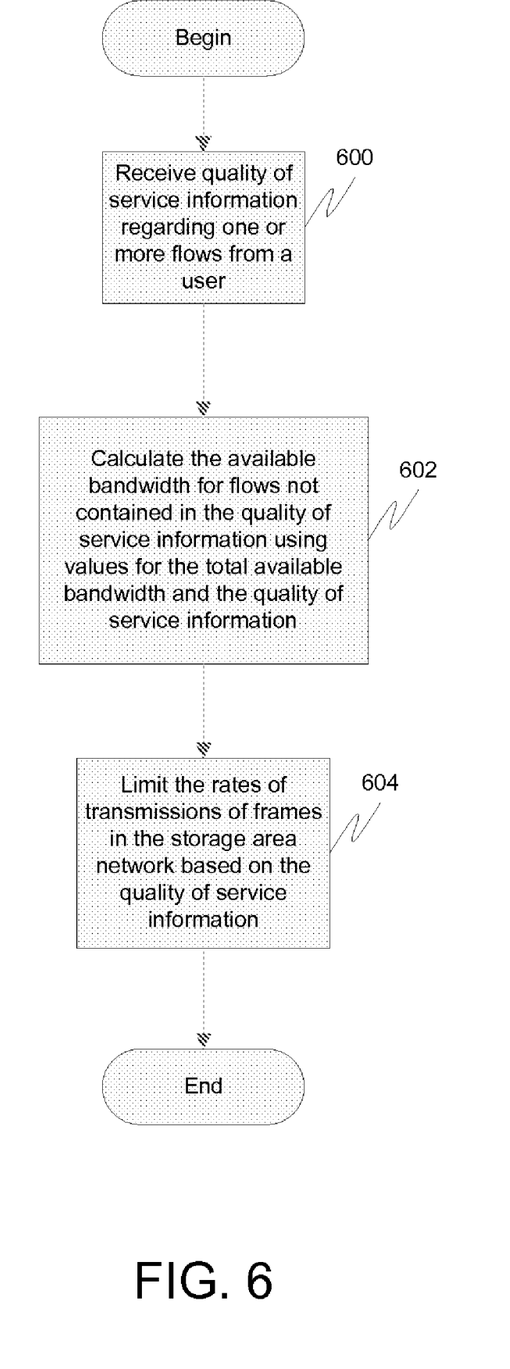
FIG. 6 illustrates an example method for providing quality of service in a storage area network.

FIG. 6 illustrates an example method for providing quality of service in a storage area network. The method may be executed at a switch located between one or more hosts and one or more targets in the storage area network. At 600, quality of service information regarding one or more flows may be received from a user. The quality of service information may include bandwidth parameters pertaining to the flow and to one of the one or more targets. It may also pertain to deeper granularities, such as initiator, LUN, and initiator-LUN. Furthermore, the quality of service information may vary for read and write commands. The bandwidth parameters may include either minimum or maximum bandwidth for the flow. The quality of service information may be stored in a data structure corresponding to each flow. At 602, available bandwidth for flows not contained in the quality of service information may be calculated using values for the total available bandwidth and the quality of service information. At 604, the rates of transmissions of frames in the storage area network may be limited based on the quality of service information. This may include determining if the available bandwidth for flows not contained in the quality of service information has been exceeded, and if so, placing incoming frames relating to the flow in a queue. This may also include, upon receipt of a frame corresponding to a particular flow, determining if a bandwidth level within the bandwidth parameters of the quality of service information for that flow has been exceeded, and if so, placing the frame in a queue.

Figure 7:
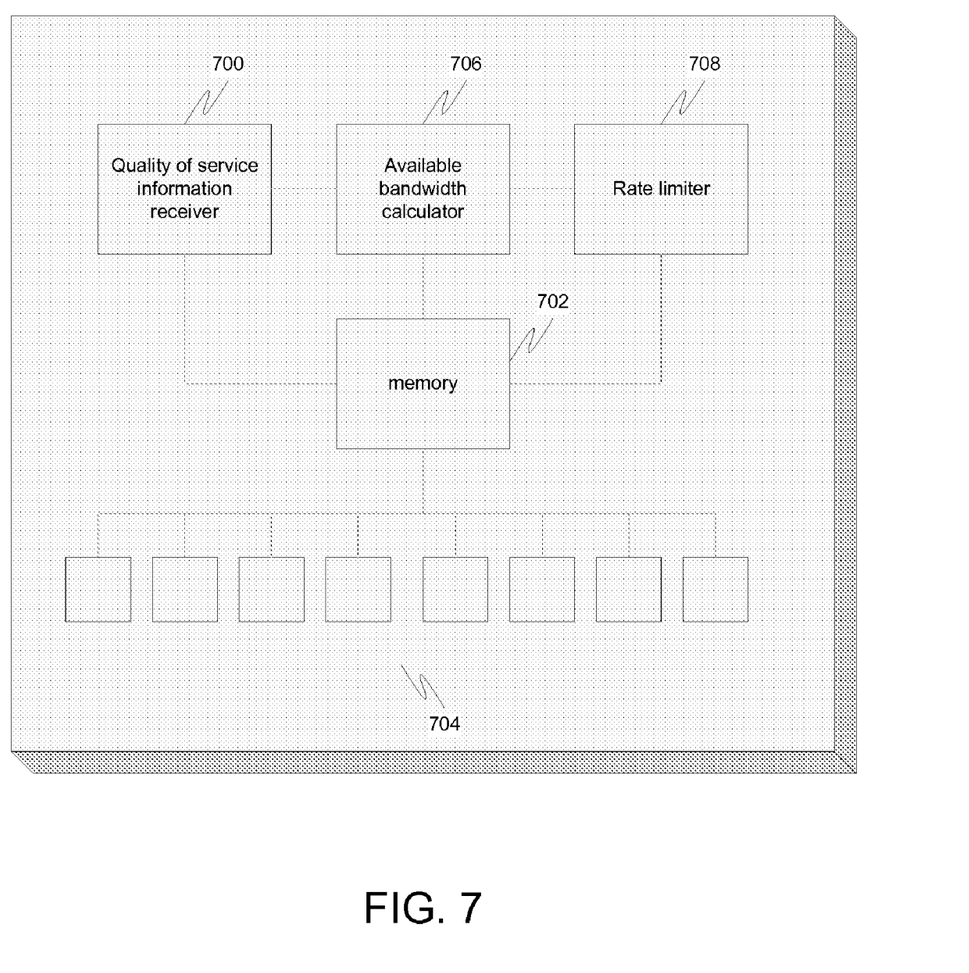
FIG. 7 illustrates an example apparatus for providing quality of service in a storage area network

FIG. 7 illustrates an example apparatus for providing quality of service in a storage area network. The apparatus may be a switch located between one or more hosts and one or more targets in the storage area network. A quality of service information receiver 700 may receive, from a user, quality of service information regarding one or more flows. The quality of service information may include bandwidth parameters pertaining to the flow and to one of the one or more targets. It may also pertain to deeper granularities, such as initiator, LUN, and initiator-LUN. Furthermore, the quality of service information may vary for read and write commands. The bandwidth parameters may include either minimum or maximum bandwidth for the flow. The quality of service information may be stored in a data structure corresponding to each flow. The data structure may be stored in a memory 702 which may be shared between multiple processors 704. An available bandwidth calculator 706 coupled to the quality of service information receiver 700 and to the memory 702 may calculate available bandwidth for flows not contained in the quality of service information using values for the total available bandwidth and the quality of service information. A rate limiter 708 coupled to the available bandwidth calculator 706 and to the memory 702 may limit the rates of transmissions of frames in the storage area network based on the quality of service information. This may include determining if the available bandwidth for flows not contained in the quality of service information has been exceeded, and if so, placing incoming frames relating to the flow in a queue. This may also include, upon receipt of a frame corresponding to a particular flow, determining if a bandwidth level within the bandwidth parameters of the quality of service information for that flow has been exceeded, and if so, placing the frame in a queue.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method for providing quality of service in a storage area network, the storage area network having one or more hosts and one or more targets, the method comprising:
receiving, at a switch, quality of service information regarding one or more flows from a user, the quality of service information including one or more bandwidth parameters pertaining to a flow, wherein the bandwidth parameters include a quality of service guarantee for a level of granularity, the level of granularity indicating whether the flow for which the quality of service is guaranteed concerns a specific host, a specific target, a specific target LUN, or a combination of two or more of such specific host, target, or target LUN;
receiving a frame at the switch;
calculating, at the switch, available bandwidth for flows not associated with the received quality of service information;
determining an expected data burst associated with the frame;
comparing the expected data burst with a current available bandwidth for the flow associated with the frame, or, if the frame is not associated with a flow, comparing the expected data burst with a current available bandwidth for flows not associated with the quality of service information; and
limiting, at the switch, the rates of transmissions of frames in the storage area network based at least in part on using the received quality of service information to determine when to forward the frame to its destination,
wherein calculating available bandwidth for flows not associated with the received quality of service information comprises using values for the total available bandwidth and bandwidth parameters from the quality of service information.

2. The method of claim 1, wherein the bandwidth parameters include minimum or maximum guaranteed bandwidth.

3. The method of claim 1, wherein the one or more targets are represented by virtual targets at the switch.

4. The method of claim 1, wherein the limiting includes:
determining if the available bandwidth for flows not associated with the quality of service information has been exceeded;
if the available bandwidth for flow not associated with the quality of service information has been exceeded, placing an incoming frame relating to the flow in a queue.

5. The method of claim 1, wherein the limiting includes:
upon receipt of a frame corresponding to a particular flow, determining if a bandwidth level within the bandwidth parameters of the quality of service information for that flow has been exceeded; and
if the bandwidth level has been exceeded, placing the frame in a queue.

6. The method of claim 5, wherein the incoming frame is transmitted once it is determined that the current available bandwidth for the flow associated with the frame is sufficient to cover the expected data burst relating to the frame.

7. A method for providing quality of service in a storage area network, the storage area network having one or more hosts and one or more targets, the method comprising:
receiving, at a switch, quality of service information regarding one or more flows from a user, the quality of service information including one or more bandwidth parameters, wherein the bandwidth parameters include a level of granularity for a flow, the level of granularity indicating whether the flow concerns a specific host, a specific target, a specific target LUN, or a combination of two or more of such specific host, target, or target LUN;
receiving a frame at the switch;
calculating, at the switch, available bandwidth for flows not associated with the received quality of service information;
determining an expected data burst associated with the frame;
comparing the expected data burst with a current available bandwidth for the flow associated with the frame, or, if the frame is not associated with a flow, comparing the expected data burst with a current available bandwidth for flows not associated with the quality of service information;
limiting, at the switch, the rates of transmission of frames in the storage area network based on using the received quality of service information to determine when to forward the frame to its destination; and
enforcing the quality of service information on a plurality of nodes based on the level of granularity, wherein the plurality of nodes are configured on devices in the storage area network,
wherein calculating available bandwidth for flows not associated with the received quality of service information comprises using values for the total available bandwidth and bandwidth parameters from the quality of service information.

8. The method of claim 7, wherein the level of granularity pertains to flows involving a specific logical unit number (LUN).

9. The method of claim 7, wherein the level of granularity pertains to flows involving a specific host to a specific LUN.

10. The method of claim 7, wherein the level of granularity pertains to flows involving a specific virtual target to a specific LUN.

11. The method of claim 7, wherein the level of granularity pertains to flows involving a specific host, a specific virtual target and a specific LUN.

12. An apparatus for providing quality of service in a storage area network, the storage area network having one or more hosts and one or more targets, the method comprising:
an interface configured to receive an incoming frame;
a quality of service information receiver configured for receiving quality of service information regarding one or more flows from a user, the quality of service information including one or more bandwidth parameters pertaining to a flow, wherein the bandwidth parameters include a quality of service guarantee for a level of granularity, the level of granularity indicating whether the flow for which the quality of service is guaranteed concerns a specific host, a specific target, a specific target LUN, or a combination of two or more of such specific host, target, or target LUN;
an available bandwidth calculator coupled to the quality of service information receiver configured for calculating available bandwidth for flows not associated with the received quality of service information;

a rate limiter coupled to the available bandwidth calculator configured for limiting the rates of transmissions of frames in the storage area network based at least in part on using the quality of service information to determine when to forward the frame to its destination, wherein the rate limiter determines an expected data burst associated with the frame and compares the expected data burst with a current available bandwidth for the flow associated with the frame, or, if the frame is not associated with a flow, comparing the expected data burst with a current available bandwidth for flows not associated with the quality of service information, wherein calculating available bandwidth for flows not associated with the received quality of service information comprises using values for the total available bandwidth and bandwidth parameters from the quality of service information.

13. The apparatus of claim 12, further comprising multiple processors configured for communication with the rate limiter.

14. The apparatus of claim 13, further comprising memory shared by each of the multiple processors, the memory configured for communication with the quality of service information receiver, the available bandwidth calculator, and the rate limiter.

15. An apparatus for providing quality of service in a storage area network, the storage area network having one or more hosts and one or more targets, the apparatus comprising:

means for receiving a frame;

means for receiving quality of service information regarding one or more flows from a user, the quality of service information including one or more bandwidth parameters pertaining to a flow, wherein the bandwidth parameters include a quality of service guarantee for a level of granularity, the level of granularity indicating whether the flow for which the quality of service is guaranteed concerns a specific host, a specific target, a specific target LUN, or a combination of two or more of such specific host, target, or target LUN;

means for calculating available bandwidth for flows not associated with the received quality of service information;

means for determining an expected data burst associated with the frame;

means for comparing the expected data burst with a current available bandwidth for the flow associated with the frame, or, if the frame is not associated with a flow, comparing the expected data burst with a current available bandwidth for flows not associated with the quality of service information; and means for limiting the rates of transmissions of frames in the storage area network based at least in part on using the received quality of service information to determine when to forward the frame to its destination, wherein calculating available bandwidth for flows not associated with the received quality of service information comprises using values for the total available bandwidth and bandwidth parameters from the quality of service information.

16. A switch for use in a storage area network, the storage area network having one or more hosts and one or more targets, the switch comprising:

one or more line cards configured to:

receive quality of service information regarding one or more flows from a user, the quality of service information including one or more bandwidth parameters pertaining to a flow, wherein the bandwidth parameters include a quality of service guarantee for a level of granularity, the level of granularity indicating whether the flow for which the quality of service is guaranteed concerns a specific host, a specific target, a specific target LUN, or a combination of two or more of such specific host, target, or target LUN;

calculate available bandwidth for flows not associated with the received quality of service information;

receive an incoming frame; and limit the rates of transmissions of frames in the storage area network based at least in part on using the received quality of service information to determine when to forward the frame to its destination, wherein the limiting involves determining an expected data burst associated with the frame and comparing the expected data burst with a current available bandwidth for the flow associated with the frame, or, if the frame is not associated with a flow, comparing the expected data burst with a current available bandwidth for flows not associated with the quality of service information, wherein calculating available bandwidth for flows not associated with the received quality of service information comprises using values for the total available bandwidth and bandwidth parameters from the quality of service information.

* * * * *